US005298309A

United States Patent [19]

Carls et al.

[11] Patent Number: 5,298,309

[45] Date of Patent: Mar. 29, 1994

[54] FILM CONSTRUCTION FOR USE IN A PLAIN PAPER COPIER

[75] Inventors: Joseph C. Carls; Alan J. Herbert; Donald J. Williams, all of Austin, Tex.

[73] Assignee: Minnesota Mining and Manufacturing Company, St. Paul, Minn.

[21] Appl. No.: 22,729

[22] Filed: Feb. 24, 1993

Related U.S. Application Data

[62] Division of Ser. No. 788,138, Nov. 5, 1991, Pat. No. 5,208,093.

[51] Int. Cl.[5] .............................................. B32B 9/00

[52] U.S. Cl. .................................. 428/195; 428/206; 428/327; 428/500; 428/913

[58] Field of Search ............... 428/195, 206, 327, 913, 428/323, 192, 413, 40, 50; 156/235; 430/18, 97, 126

[56] References Cited

U.S. PATENT DOCUMENTS 2,143,214 3/1935 Selenyi ............................... 178/7.3
2,221,776 11/1938 Carlson .................................. 95/5
2,297,691 4/1939 Carlson .................................. 95/5
2,357,809 11/1940 Carlson ................................ 95/11
2,855,324 10/1958 VanDorn ............................ 117/25
3,017,560 1/1962 Polster ................................ 321/45
3,520,811 7/1970 Swoboda ......................... 252/62.54
3,620,726 11/1971 Fu-Wua Chu et al. ........... 96/27 R
3,640,749 2/1972 Lorenz ................................ 117/28
3,773,417 11/1973 Pressman et al. ...................... 355/3
4,071,362 1/1978 Takemaka et al. .................... 96/1.4
4,377,303 6/1982 Sahyun et al. ....................... 430/11
4,656,087 4/1987 Lubianez ............................ 428/323
4,873,135 10/1989 Wittenbel et al. ................. 428/192

FOREIGN PATENT DOCUMENTS 0052938 6/1982 European Pat. Off. ...... G03G 7/00
0078475 5/1983 European Pat. Off. ...... G03G 7/00
0104074 3/1984 European Pat. Off. ...... G03G 7/00
0349227 6/1989 European Pat. Off. ...... G03G 7/00
0332183 9/1989 European Pat. Off. ...... G03G 7/00

OTHER PUBLICATIONS

Patent Abs. of Japan vol. 12, No. 443, Nov. 1980, Fukao.
Patent Abs. of Japan vol. 7, No. 270, Dec. 2, 1983.

*Primary Examiner*—Patrick J. Ryan
*Assistant Examiner*—William A. Krynski
*Attorney, Agent, or Firm*—Gary L. Griswold; Walter R. Kirn; Darla P. Neaveill

[57] ABSTRACT

An electrographic article comprising a polymeric film having at least one polymeric receptor layer coated on at least one side thereof, said receptor layer having an equivalent or lower storage elasticity modulus than a toner resin used for forming images on said article.

9 Claims, 1 Drawing Sheet

FILM CONSTRUCTION FOR USE IN A PLAIN PAPER COPIER

This is a division of application Ser. No. 788,138, filed Nov. 5, 1991, now U.S. Pat. No. 5,208,093, issued May 4, 1993.

BACKGROUND OF THE INVENTION

1. Field of the Invention

This invention relates to electrography, and a method of development, transfer and fixing of dried toner electrographic images. Specifically, it relates to such images for use in overhead projectors, especially to color images for use therein.

2. Description of the Related Art

Electrography refers to the processes of electrophotography, electroradiography, and magnetography. The process of electrography has been described in numerous patents, such as U.S. Pat. Nos. 2,221,776, 2,297,691, and 2,357,809, (Carlson). The process, as taught in these and other patents, essentially comprises production of a latent electrostatic image using photoconductive media and the subsequent development and transfer of a visible image therefrom. A latent electrostatic image may also be formed by spraying the charge onto a suitable charger-retaining surface as taught, for example, in U.S. Pat. Nos. 2,143,214, 3,773,417, and 3,017,560. In magnetography, the latent image is magnetic and may be developed with appropriately magnetized or magnetizable developer particles, as described in U.S. Pat. No. 3,520,811.

Development of the latent image can be accomplished by deposition of developer particles on the electrostatic or magnetic latent image, the most common technique using powder, cascade, or less frequently, liquid developers.

It is well known in the art to use dry powder toner to develop a latent electrostatic image. U.S. Pat. No. 2,855,324 discloses thermoplastic coated receptors to which a dry toner image may be transferred by contact under pressure. U.S. Pat. No. 3,640,749 discloses coating a transferred dry powder image and receptor with a dispersion of a synthetic resin in water. U.S. Patent No. 4,071,362 discloses use of a receptive styrene-type resin on a thermally resistant base film to fuse with thermoplastic coated dry toner particles (i.e., image-fixing is achieved by use of a special toner). U.S. Pat. No. 3,620,726 discloses the use of pigment developer of particle size within the range of 5.0 to 10.0 microns, with not more than 50% of the particles being of less than 1 micron equivalent spherical diameter, thereby reducing background stain. As mentioned, this type of transfer may result in problems of durability.

To avoid such durability problems, various liquid developers have been employed as disclosed in U.S. Pat. 4,337,303, (Sahyun et al.). The liquid toner is encapsulated into a homogeneous continuum of particles within the soft or softened receptor coating. At least 75% of the transferred particles must be embedded within the surface such that they do not protrude.

Particles have also been used in transparencies. U.S. Pat. No. 4,869,955, (Ashcraft et al.) discloses a transparency comprising a polyester support, and at least one toner receptor layer comprising a mixture of an acrylate binder, a polymeric antistatic agent having carboxylic acid groups, a crosslinking agent, and two types of beads, i.e., a butylmethacrylate modified polymethacrylate bead and submicron polyethylene or tetrafluoroethylene beads. The smaller beads are disclosed to improve scratch resistance, and have a particle size of less than one micron, while the polymethacrylate beads are disclosed to assist in transport of the film through the copier and have a particle size of from about 1 to about 5 microns in size.

Where full color images are desired, additional considerations are required. Frequently the prior art processes using dry developing methods showed bright, full color images when the film was inspected, but showed an overall gray tone when the image was projected. As a result the color-tone reproduction range was very narrow.

European patent application no.0349,227, discloses a transparent laminate film for full color image forming comprising two transparent resin layers. The first resin layer is heat-resistant, and the second resin layer must be compatible with a binder resin constituting the toner to be used for color image formation. The second resin layer must have a larger elasticity than that of the binder resin of the toner at a fixing temperature of the toner, preferably in the range of 5 to 1000 times larger than such binder elasticity. While it is stated at page 5, lines 8–26, that resins of the same "kind", i.e., type, e.g., styrene-type or polyester-type, may be used as the toner binder and the second transparent resin layer, the resins must still differ in storage elasticity modulus as previously stated.

It is further specifically stated at page 7, lines 9–14, that where the melt viscosity of the second layer becomes lower than the viscosity of the toner binder resin, it is difficult to develop good color mixing.

It has now been discovered that a good image, even a good full-color image is provided by an electrographic article having a polymeric receptor layer wherein the storage elasticity modulus is equivalent to, or less than that of the toner resin.

It has also been discovered that using polymeric, silica or starch particles in transparent electrographic articles creates a sufficient gap between the film and smooth surfaces with which it contacts that transfer of fuser oil to the projector glass and pooling of fuser oil between the article and a protective sleeve is reduced or eliminated.

SUMMARY OF THE INVENTION

The present invention provides an electrographic article comprising a polymeric film having at least one polymeric receptor layer coated on at least one side thereof, said receptor layer having an equivalent or lower storage elasticity modulus than a toner resin used for forming images on said article.

Preferable articles of the invention comprise a polymeric receptor layer having a storage elasticity modulus about equivalent to the toner resin.

One specific embodiment of the invention provides an electrographic article capable of providing a good full color image when the image is projected.

One preferred embodiment of the invention further comprises polymeric or starch particles, at least 50% of such particles protruding from the polymeric receptor layer, preferably at least 75%, prior to imaging with a toner. Preferably, when starch particles are used, particles are present in an amount such that distribution in the polymeric receptor layer is greater than about 2 particles/MM2$^{2}$. The particles have an average particle size of at least about 5 $\mu$m. When polymeric particles, e.g., polymethylmethacrylate (PMMA), polystyrene, and the like are used, particles are present in an amount such that distribution in the polymeric receptor layer is greater than about 5 particles/mm$^2$. These particles also have an average particle size of at least about 5 $\mu$m.

Yet another preferred embodiment of the invention provides an electrographic article having Attached releasably thereto an overlay, at least a portion of such overlay being opaque. The overlay is preferably a porous sheet which reduces fuser problems due to elasticity of the porous sheet. It also minimizes slippage of the film in the fuser, in xerographic machinery, and by reducing the maximum temperature of the film, fuser exit creasing is decreased.

The following terms have these meanings when used herein.

1. The term "transparency" means a transparent electrographic article carrying a toner image suitable for projection on an overhead projector.

2. The terms "copier", "copying machine" are used interchangeably to refer to any electrographic or xerographic apparatus which is capable of forming an image on an article of the invention.

3. The terms "envelope", "sleeve" and "cover" are used interchangeably to refer to a protective article for a transparency, typically consisting of a pocket of transparent plastic sheet material open along at least one side edge for insertion of the transparency.

As used herein, all parts, percents, and ratios are by weight unless specifically otherwise defined.

DETAILED DESCRIPTION OF THE INVENTION

Figure 1:
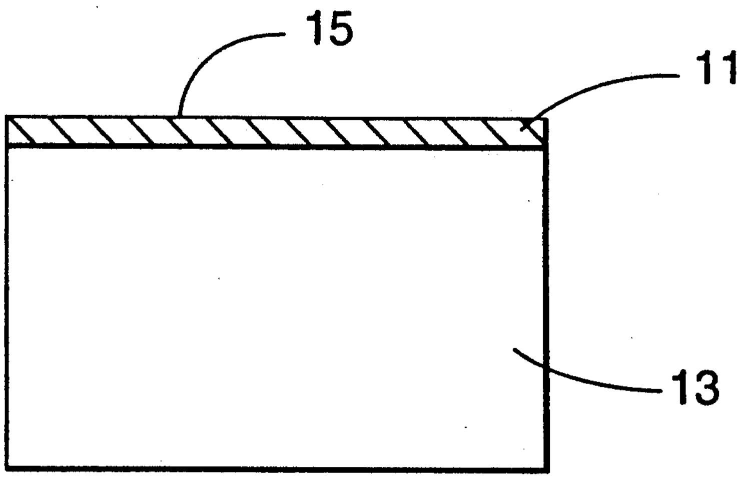
FIG. 1 shows an electrographic article having an overlay consisting of a sensing stripe.

Polymeric film layers useful as a substrate in electrographic articles of the invention include heat-resistant films such as polyester, e.g., polyethylene terephthalate, polymethyl-methacrylate, cellulose triacetate, polyethylene, polystyrene film, polyvinylidene fluoride, polyvinyl chloride, such as polyamides, and polyimides. Preferred film layers include polyethylene terephthalate. Such films are widely commercially available from such companies as Minnesota Mining and Manufacturing (3M), ICI and E.I. DuPont de Nemours (DuPont).

The substrate should preferably have a thickness of from about 50 $\mu$ to about 150 $\mu$.

Useful polymeric receptor layers include thermoplastic resins such as polyester resins, styrene resins, polymethylmethacrylate resins, epoxy resins, polyurethane resins, vinyl chloride resins, and vinyl chloride-vinyl acetate resins.

Preferred receptor layers include polyester resins, e.g., polyesters based on bisphenol A, such as ATLAC™ 382E, (also sold as ATLAC™ R 32-629), available from Reichold Chemical as well as bisphenol A monomers and their derivatives, (e.g., the dipropylene glycol ether of bisphenol A). A suitable carrier binder such as Vitel PE 222 polyester resin, available from The Goodyear Tire and Rubber Company, is also present when bisphenol A monomers or their derivatives are used to facilitate coating. The thickness of the receptor is preferably between about 0.5 to about 10 $\mu$m, more preferably from about 1 to about 6.5 $\mu$m.

When full color images are made in the electrographic apparatus, the color image is developed, then finished or "fixed". The fixing device involves the use of heated rollers which are coated with a silicone oil to prevent smearing of the images, and to provide easy release of the image from the roller's surface. Images on transparencies require much more effective coalescence of toner particles than images on paper because the transparency image is projected. Therefore, a longer residence time is usually needed in the fixing device in order to fix the image. During this residence time, the fuser deposits much more oil onto the surfaces of the film than would be deposited during the shorter residence time of paper being imaged. This oil gives the transparency an objectionable sensation to the touch. Further, while the oil does not seem to have a detrimental effect on the image when projected, it is transferred onto the projector stage, where it transfers onto subsequently used transparencies, as well as the hands and possibly clothing of the presenter.

Transparencies are frequently inserted for use into an envelope or cover,.e.g., those disclosed in U.S. Pat. No. 4,402,585, (Gardlund), incorporated herein by reference. These envelopes are commercially available from 3M under the trademark Flip-Frame™. The envelope provides convenient usage, and notebook storage. Further, it protects the transparency image from damage caused by distortion of the film, creasing, scratching, smearing, tearing, and the like. This is especially important with full color transparencies, which are expensive. However, the use of the envelope provides a further problem when a large amount of fuser oil is present.

The oil migrates to the regions where the transparency touches the sleeve, forming visible pools as large as several centimeters. When projected, the edges of the pools are visible and quite objectionable.

It has been found that adding certain polymeric, silica or starch particles reduces the pooling of the oil at the edges of the sleeves and inhibits transfer of the oil to projection stages.

Useful polymeric particles include, but are not limited to, polymethacrylate, and modified polymethacrylate particles such as polybutylmethacrylate, polymethylmethacrylates, hydroxyethymethacrylate, and mixtures or copolymers thereof, polystyrene, polyethylene, and the like. It is preferred to make such particles as a dispersion to obtain uniformity of size, and shape, and to crosslink the particles to promote nonaggregation. Preferred polymeric particles range in size from about 5 $\mu$m to about 25 $\mu$m, and are present in amounts of greater than 5 particles/mm$^2$. At the larger end, the particles may be somewhat visible; however they do not affect the fusing or the quality of the image.

Useful starch particles are from about 5 to about 25 $\mu$m in diameter, more preferably from about 10 to about 20 $\mu$m in diameter. Larger particles are effective to reduce the oil pooling, but have the problem of being visible when projected. Smaller particles, i.e., less that 5 $\mu$m, in diameter may be used, but a higher loading is required to effectively reduce the oil pooling. This often results in higher haze of the final image. Also, the smaller particles are not effective in regions of the transparency where the thickness of the toner layer exceeds the extent to which the particles normally protrude from the receptor layer. This is especially important when multiple toner layers are present, e.g., in color electrophotography. For example, after fusing a two layer green (cyan plus yellow) toner layer on a Canon "CLC 200", the toner thickness can be from about 3.5 to about 11 μm.

Preferred starch particles include "LOKSIZE 30" starch particles, available from A.E. Staley Company.

Surprisingly such large particles do not affect the quality of the image when used in the required amounts. It is especially surprising that such particles, when properly chosen, do not interfere with the fusing of the images.

In another specific embodiment of the invention, the article has an overlay attached thereto, at least a portion of which is an opaque sensing stripe. The stripe is typically 5–15 mm in width, and is adhered along and in register with the leading edge of the transparent sheet. The purpose of the overlay is to signal the copying machine that a transparency has been fed therein. The copier then reduces the fuser speed to increase the fusing time. Without the opaque overlay, a transparency cannot be seen by the copier. If the width of the overlay exceeds about 20 mm, the film is treated identically to a piece of paper, with no reduction in fuser speed.

Preferably, such an article further comprises a second opaque region, or "tab", preferably made from an opaque porous sheet, e.g., a porous polymeric or paper sheet. This second opaque region underlies the transparent sheet, and is spaced from the first opaque stripe, leaving a transparent window of from about 5 mm to about 15 mm in width. This opaque tab can be bonded to the transparent sheet by a repositionable adhesive composition. Such compositions are well known in the art, e.g., those particulate adhesives disclosed in U.S. Pat. No. 3,691,140, (Silver et al.), incorporated herein by reference.

The use of such a tab reduces processing problems in the fuser area of the copier due to the elasticity of the porous sheet. It minimizes slippage of the film in the fuser, and by reducing the maximum temperature of the film, fuser exit creasing is decreased.

Also, the tab absorbs all of the silicone oil present on the back of the film and therefore eliminates the coating of starch particles on the underside of the transparency film. Finally, the image may be immediately previewed against an opaque background.

An alternative construction for the overlay involves the use of a single opaque sheet to constitute both the sensing stripe and the tab. The leading edge is in register with the leading edge of the transparent sheet. However, the sheet has one or more transparent windows, parallel to both short and long edges of the transparency, and placed at least about 5 to about 15 mm from the edge. The length of the window must be sufficient to reliably trip the sensor on, the copier, preferably at least about 40 mm. To allow the film to work in machines having differing sensor locations, the length of the windows may be extended to as much as about 75% of the length of the edge to which they are parallel. Such windows may be die-cut or formed by any conventional means, and are from about 5 mm to about 15 mm in width. The windows allow the article to be fed with either edge as the leading edge, as well as facilitating easier processing due to the use of a single sheet.

DETAILED DESCRIPTION OF THE DRAWINGS

In FIG. 1 an opaque sensing stripe, 11 is releasably attached to the transparent sheet 13 in line with the leading edge 15.

Figure 2:
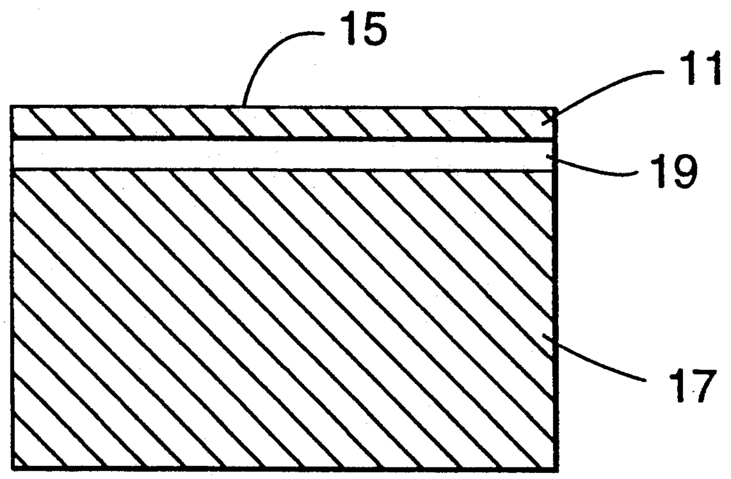
FIG. 2 shows an electrographic article having an opaque overlay consisting of a sensing stripe and a tab.

In FIG. 2, an opaque sensing stripe, 11, is releasably attached to a transparent sheet in line with the leading edge, 15. A tab, 17, also releasably attached, is separated from the sensing stripe by a transparent window, 19, parallel to the leading edge.

Figure 3:
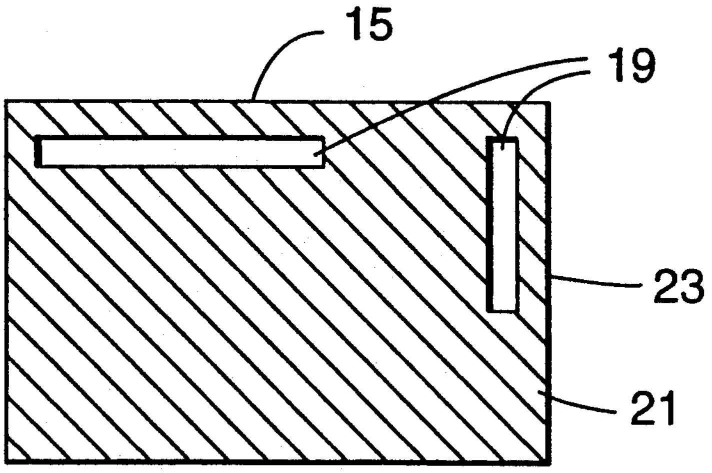
FIG. 3 shows an electrographic article having an opaque overlay consisting of a single opaque sheet having one or more transparent windows.

In FIG. 3, the overlay comprises a single opaque sheet, 21, adhered releasably along, and in register with the leading edge, 15 of the transparent sheet. The overlay has two die-cut transparent windows, 19. One of the die-cut windows, 19, is parallel to the long edge, 15, and one window, 19, is parallel to the short edge, 2.3, of the transparency, which allows the transparency to be rotated so that the short edge, 23, can then be used as the leading edge, if desired.

TEST METHODS

Haze Test

Haze is measured with the Gardner Model XL-211 Hazeguard hazemeter or equivalent instrument. The procedure is set forth in ASTM D 1003-61 (Reapproved 1977). This procedure measures haze of the unprocessed film.

IMAGE TRANSPARENCY

Image transparency or "Pastel Hazel" measures how much light is scattered by a fused toner layer. Higher quality images have lower pastel haze values. The haze of a yellow halftone was measured using a Gardner Model XL-211 Hazeguard hazemeter. First, the machine is zeroed with no film in place, the Reference/Open switch set to "Open". Next, the film is placed at the entrance port, and set the switch to "Reference" and record the reading. Again set the Ref/Open switch to "Open" and record reading. The percent Haze is computed according to the following formula.

$$\% \text{ Haze} = \frac{(\text{Open Reading} \times 100\%)}{\text{Reference Reading}}$$

COLOR REPRODUCTION QUALITY

Color reproduction quality was measured using a Gardner Spectroguard Color System, a single beam spectrophotometer using a halogen lamp filtered to simulate CIE D65. This instrument was selected for its large aperture, higher accuracy, and ability to quantitatively measure color reproduction accuracy. L*a*b* was measured in transmission mode using a viewing angle 20° from normal.

The L*a*b* color space is a quantitative, three-dimensional description of color; the three axes L*, a*, and b* represent independent aspects of a particular color. The L* axis measures the white to black level, with increasing values approaching white. The a* axis measures green to red levels of color, with more negative a* approaching green, and more positive a* approaching red. The b* axis measures the blue to yellow color level, with more negative b* approaching blue and more positive b* approaching yellow. The origin, where a*=b*=O, corresponds to grey.

Transparencies achieve full color by reducing the light scattering that results from poor fusing of the colored toner. Transparencies that fuse poorly, and therefor reproduce color poorly have low absolute values for both a* and b*, and thus an overall grey appearance. Films that provide more effective fusing show increased absolute values of a* and b*, and appear to have more color. The maximum absolute value of a* and b* for a particular color is determined by the amount of toner deposited by the copying machine and the a* and b* of the toner. These values are achieved when the toner fuses to form a haze free layer. The values of a* and b* achieved by a transparency film prepared in the normal operation of a color copier can only approach these limits.

A low color haze reference standard was prepared by imaging the test pattern used in all of the Examples on a film of the type used in Example 2. The imaged film was removed from the copying machine before traversing the fuser, yielding a toned but unfused film, and processed in the following manner. The film was placed in a vacuum oven, evacuated to about 20 Torr and heated to about 100° C. for about 10 minutes. The vacuum was then released and the film removed. This procedure resulted in well fused, highly transparent toner patterns. This procedure eliminates the effects of the fuser and minimizes the receptor effect on the L*a*b* values of an image.

In general, if the absolute value of the a* or b* values of an imaged film are at least about 5 units less than that of a comparable reference film, then the perceived color quality will be noticeably poorer than that of the reference. Typically, as a* or b* values increase, there is a corresponding decrease in the value of L*. The reference films are not perfect references because some haze remains, and small amounts of toner can be lost when the film is removed from the machine. The values for reference films are shown in conjunction with the corresponding film of the invention.

Because the amount of toner deposited varies according to environmental conditions, a reference should be used to directly compare only those films imaged at the same time and under the same machine settings.

POLYMER MECHANICAL PROPERTIES

Melt viscosity and storage modulus were measured with a Rheometrics "RDA II" dynamic mechanical analyzer, following the standard procedures recommended by Rheometrics. A strain sweep was used at a frequency of 6.24 radians per second. The results are reported in poise, and dynes/cm$^2$, respectively.

FLOW PATTERN

The receptor may flow when it melts during passage through the fuser. Flow patterns are undesirable. Very small scale flows can be tolerated, but larger scale flow patterns degrade the resolution of the film. Thick receptor layers have increased incidence of large flow patterns.

"Crockmeter" Test

The abrasion-resistance characteristic is measured with a standard AATCC Crockmeter, manufactured by Atlas Electric Devices Co., typically in a 10 cycle test. A white cotton cloth circle having a diameter of about 1.25 cm is clipped onto the tip of the Crockmeter arm. A mass of 500 g is applied to the tip. The covered tip is then rubbed across the image 10 times. The piece of cloth is then removed, and the optical density of the cloth is measured, using a Mac Beth densitometer. A larger density typically means more material removed, and therefore undesirably lower abrasion resistance.

The following examples are intended to be nonlimiting in nature. The scope of the invention is solely that defined by the claims.

EXAMPLES

EXAMPLE 1

A coating solution was prepared by mixing the following, producing a 26.25% solids solution:

| | |
|---|---|
| Atlac 382E[1] | 25.0 g |
| Cyastat 609[2] | 0.75 g |
| Vitel PE-200[3] | 0.50 g |
| Methylethyl ketone | 36.125 g |
| Toluene | 36.125 g |

[1]Atlac 382E is available from Reichold Chemicals. The storage modulus of this material at 160° C. is 16 dyne/cm.
[2]Cyastat 609 is available from American Cyanamid.
[3]PE-200 is available from The Goodyear Tire and Rubber Company.

The solution was coated using the reverse roll technique onto 100 μm (4 mil) heat-treated, unprimed polyethylene terephthalate film (PET), available under the Sootchpar TM brand name from Minnesota Mining and Manufacturing (3M). The roll speeds in feet per minute were rubber-100, casting-110, metering-58, fountain-150. The coating gap was about 25 μm. The coated films were subsequently dried in a forced air oven for about 2.5 minutes at 85° C., followed by 30 seconds at 450° C. The resulting coatings were clear and uniform, having a coating weight of about 3.2 g/M$^2$, and a thickness of about 3 μm. The haze of these films was about 0.8%.

EXAMPLE 2

A transparency film suitable for use in a canon Color Laser Copier or the like was prepared by applying a stripe of Post-It TM brand correction tape to the leading edge (with respect to insertion into the machine) of the films prepared in Example 1. The width of the stripe was 8.5 mm. The stripe extended the entire length of the leading edge, approximately 28 cm (11 inches). The construction used is illustrated in FIG. 1.

The film was fed into a Canon "CLC 200" copier, and a full color test pattern copied thereon. The toner was deposited on the coated side of the film. The film was fed in bypass mode, causing the proper reduction in fuser speed, and yielded toned images that were better fused and more transparent upon projection. The projected images were bright and clear and the colors saturated. There was no image grayness that would indicate excessive scattered light. The following measurements were made:

| Pastel Haze: 2.89% Resolution: 4.5 line pairs/mm | | | |
|---|---|---|---|
| Color Quality: | L* | a* | b* |
| Magenta: | 79.94 | 34.29 | −15.92 |
| Red: | 78.58 | 31.35 | 39.18 |
| Yellow: | 95.73 | −1.94 | 58.50 |
| Green: | 75.30 | −39.50 | 19.46 |
| Cyan: | 75.07 | −39.92 | −32.50 |
| Blue: | 61.04 | −9.48 | −46.37 |
| | Reference Film | | |
| Color Quality | L* | a* | b* |

-continued

| | | | |
|---|---|---|---|
| Magenta: | 79.45 | 32.80 | −14.87 |
| Red: | 79.19 | 28.60 | 30.30 |
| Yellow: | 94.82 | −2.29 | 53.80 |
| Green: | 75.92 | −34.73 | 12.45 |
| Cyan: | 74.33 | −38.52 | −32.12 |
| Blue: | 62.51 | −7.84 | −43.41 |

As can be seen from the above data, the color qualities of the film of the invention are at least as good as, and sometimes better than the qualities of a reference film having virtually no haze.

EXAMPLE 3

A transparency film suitable for use in a Canon Color Laser Copier or the like was prepared by applying a stripe of opaque Post-It- brand correction tape to the leading edge of a transparency film as in Example 2. The major portion of the film was covered with an opaque tab, leaving an uncovered gap of approximately 8 mm between the opaque stripe and the second opaque tab. The construction used in this example is illustrated in FIG. 2.

The film was fed through a Canon "CLC 200" in bypass mode as described in Example 2. The tab allowed preview of the image, reduced slippage in the fuser, and minimized flow of the receptor during fusing. The silicone oil from the fuser was removed from the back side of the film along with the opaque tab, onto which it had deposited.

EXAMPLE 4

A transparency film suitable for use in a canon Color Laser Copier or the like was prepared by tabbing the film from Example 1 with a 21.6 cm by 28 cm (8½×11 inches) piece of paper into which two windows had been cut. The first window coincided with the sensor location of the copier when the film was fed using a 28 cm leading edge and the second coincided with the sensor location when the film was fed using a 21.6 cm leading edge. The windows were placed approximately 8.5 mm from the leading edge of the film, and had a width of about 8 mm and a length of about 8 cm each. The placement of the windows for the construction used in this example is illustrated in FIG. 3, show tabbed side up.

The film was fed through a Canon "CLC,200" in bypass mode as described in Example 2. The windowed paper allowed preview of the image, reduced slippage in the fuser, and minimized flow of the receptor during fusing. In addition, this construction had the advantage that it could be fed using either length edge as the leading edge.

EXAMPLES 5-10

For examples 5-8, portions of the solution prepared in example 1 were coated onto PET film using #60, #40, #120, and #10 Meyer bars, respectively. For example 9, the solution was first diluted by adding 2.5 g of methyl ethyl ketone (MEK) and 2.5 g of toluene to 5 g of the solution, and then the solution was coated using a #10 Meyer bar.

For example 10, the solution from example 9 was first diluted by adding 2.5 g of MEK and 2.5 g of toluene to 5 g of the solution from example 9, and the resulting solution was coated using a #10 Meyer bar.

The coated films were then dried in a forced air oven at 93° C. for three minutes. A Post-It TM, brand tape stripe was applied and a test pattern was imaged onto the film as described in Example 2. The resulting physical properties of the images are shown in Table 1. Color Quality is shown in Table 2. Crockmeter tests showed that there was no measurable abrasion of toner from any of the samples.

TABLE 1

| Example No. | Coating Weight (g/m²) | Pastel Haze (%) | Resolution (line pairs/mm) | Flow Pattern (scale) |
|---|---|---|---|---|
| 5 | 29.8 | 13.18 | <1.0 | large |
| 6 | 17.8 | 3.00 | <2.0 | large |
| 7 | 7.8 | 2.07 | 4.5 | small |
| 8 | 3.3 | 1.69 | 4.5 | none |
| 9 | 1.6 | 1.99 | 4.5 | none |
| 10 | 0.8 | 2.52 | 4.5 | none |

TABLE 2

| Color Quality: | L* | a* | b* |
|---|---|---|---|
| Magenta: | | | |
| Ex. 5 | 80.92 | 29.44 | −12.01 |
| Ex. 6 | 80.15 | 30.68 | −11.29 |
| Ex. 7 | 79.93 | 31.44 | −9.55 |
| Ex. 8 | 77.67 | 37.34 | −15.53 |
| Ex. 9 | 77.75 | 36.58 | −14.92 |
| Ex. 10 | 77.68 | 36.62 | −13.57 |
| Red: | | | |
| Ex. 5 | 79.75 | 28.61 | 11.31 |
| Ex. 6 | 79.49 | 29.38 | 10.53 |
| Ex. 7 | 78.92 | 31.07 | 9.80 |
| Ex. 8 | 77.46 | 33.68 | 12.13 |
| Ex. 9 | 78.09 | 32.39 | 13.62 |
| Ex. 10 | 78.40 | 31.61 | 18.50 |
| Yellow: | | | |
| Ex. 5 | 95.60 | −1.48 | 28.54 |
| Ex. 6 | 95.52 | −1.54 | 28.09 |
| Ex. 7 | 95.68 | −1.73 | 29.39 |
| Ex. 8 | 95.58 | −2.15 | 37.81 |
| Ex. 9 | 95.64 | −2.17 | 35.70 |
| Ex. 10 | 95.63 | −2.35 | 39.44 |
| Green: | | | |
| Ex. 5 | 80.35 | −26.39 | 3.73 |
| Ex. 6 | 80.10 | −26.82 | 2.41 |
| Ex. 7 | 80.41 | −27.69 | 3.21 |
| Ex. 8 | 79.03 | −30.27 | 1.45 |
| Ex. 9 | 79.78 | −28.96 | 4.98 |
| Ex. 10 | 79.27 | −30.22 | 7.57 |
| Cyan: | | | |
| Ex. 5 | 78.20 | −30.42 | −26.24 |
| Ex. 6 | 77.62 | −31.51 | −27.19 |
| Ex. 7 | 77.98 | −32.34 | −27.52 |
| Ex. 8 | 76.71 | −35.58 | −29.77 |
| Ex. 9 | 75.84 | −37.19 | −30.78 |
| Ex. 10 | 74.76 | −39.28 | −32.28 |
| Blue: | | | |
| Ex. 5 | 64.23 | 1.30 | −39.48 |
| Ex. 6 | 64.51 | −1.35 | −39.60 |
| Ex. 7 | 63.51 | −3.31 | −41.91 |
| Ex. 8 | 61.26 | −2.13 | −44.44 |
| Ex. 9 | 60.66 | −4.72 | −45.58 |
| Ex. 10 | 59.93 | −5.42 | −46.49 |

These numbers cannot be compared directly to the reference film shown in Example 2 as they were hand coated rather than machine coated. However, the examples demonstrate a significant trend wherein the color quality values tend to increase as the receptor coating weight decreases. The Pastel Haze does begin to increase at a coating weight below about 1 g/m².

EXAMPLE 11

A 25% solids slurry of "LOKSIZE" 30 starch particles, available from A.E. Staley Co, Starch Group, in 50/50 MEK/toluene solvent was homogenized at 2000

PSI. After two days, the slurry had settled into a layer about 1 cm thick. A sample was drawn from this concentrated slurry and was found to contain 50.75% starch particles by weight.

A 0.061 g sample of the concentrated slurry was added to 15 g of the solution of Example 1, yielding a solution approximately 0.21% starch solids. This solution was coated onto PET film using a #10 Meyer rod. The coated film was dried in a forced air over at 93° C. for three minutes. A Post-It TM brand tape stripe was applied and a test pattern was then imaged onto the film as described in example 2. These imaged films were immediately placed into a Flip-Frame TM transparency protector, available from 3M Company. Since there were not particles on the back side of the transparency film, a piece of paper was inserted to prevent pooling between the back of the film and the transparency protector. Thus, any observed pooling occurred between the protector and the side of the film containing the starch particles. A static downward load of 6.2 kg was applied uniformly over an area of 9.5×20 cm of the protector for 12 hours to accelerate any pooling of fuser oil.

EXAMPLE 12

A solution was made by mixing 7.5 g of the solution from Example 11 with 7.5 g of the solution from example 1, yielding a solution having about 0.1% starch solids. The solution was coated onto PET film, and processed as described in Example 11.

EXAMPLE 13

A solution was made by mixing 7.5 g of the solution from Example 12 with 7.5 g of the solution from Example 1, yielding a solution having about 0.05 starch solids. The solution was coated onto PET film and processed as described in Example 11.

EXAMPLE 14

A solution was made by mixing 7.5 g of the solution from Example 13 with 7.5 g of the solution from Example 1, yielding a solution having about 0.025 % starch solids. The solution was coated onto PET film and processed as described in Example 11. Table 3 summarizes the results of these examples.

TABLE 3

| Example No. | Particle Count (#/mm²) | Haze (%) | Oil Pooling (not toned) | O.P. (w/two layers toner) |
|---|---|---|---|---|
| 11 | 6.42 | 1.4 | none | none |
| 12 | 3.67 | 0.9 | none | slight |
| 13 | 1.85 | 0.7 | some | pools |
| 14 | 1.13 | 0.7 | pools | pools |

EXAMPLE 15

A 25.75% solids coating solution was prepared by mixing the following:

| | |
|---|---|
| Bisphenol A-157[1] | 12.50 g |
| Cyastat TM 609[2] | 0.75 g |
| Vitel TM PE-222[3] | 12.50 g |
| Methylethyl ketone | 74.25 g |

[1]Bisphenol A-157 is available from Shell Chemical Company.
[2]Cyastat 609 is available from American Cyanamid.
[3]Pe-222 is available from The Goodyear Tire and Rubber Company.

The storage modulus of a 50/50 blend of Bisphenol A-157 and PE-222 at 160° C. was measured and found to be about 30 dyne/cm². The solution was coated onto polyester film using a #11 Meyer bar. The coated film was dried in a forced air oven at 93° C. for two minutes. The resulting coatings were clear and uniform, having a coating weight of about 2.4 g/m². The haze of these films was about 6.8% A Post-It- TM stripe was applied and a test pattern was imaged onto the film as described in Example 2. The images on the film were clear and bright. These films were handcoated, therefore their images are comparable to those described in Examples 5-10. The Pastel Haze was about 9.34%, and the Resolution was 4 line pairs/mm.

TABLE 4

| Color Quality: | L* | a* | b* |
|---|---|---|---|
| Magenta: | 79.23 | 34.36 | −12.38 |
| Red: | 79.46 | 30.49 | 16.23 |
| Yellow: | 95.98 | −2.29 | 40.48 |
| Green: | 79.65 | −30.17 | 6.68 |
| Cyan: | 75.54 | −38.01 | −31.40 |
| Blue: | 63.37 | −8.28 | −43.14 |

EXAMPLE 16

A 20.06% solids coating solution was prepared by mixing the following:

| | |
|---|---|
| COLOK TM 265[1] | 0.68 g |
| Vitel TM PE-222[2] | 2.03 g |
| Methylethyl ketone | 5.40 g |
| Toluene | 5.40 g |

[1]COLOK TM 265 is available from Henkel Corporation.
[2]PE-222 is available from The Goodyear Tire and Rubber Company.

The storage modulus of a 25/75 blend of COLOK TM 265 and PE-222 at 160° C. was measured and found to be about 5 dyne/CM². The solution was coated onto polyester film using a #10 Meyer bar. The coated film was dried in a forced air over at 93° C. for two minutes. The resulting coatings were clear and uniform, having a coating weight of about 2.6 g/M². The haze of these films was about 0.6%. A Post-It- TM stripe was applied and a test pattern was imaged onto the film as described in Example 2. The images on the film were clear and bright. These films were handcoated, therefore their images are comparable to those described in Examples 5-10. The Pastel haze was measured to be 1.74%; the resolution was 2.2 line pairs/mm.

TABLE 5

| Color Quality: | L* | a* | b* |
|---|---|---|---|
| Magenta: | 78.30 | 34.87 | −12.62 |
| Red: | 78.85 | 29.76 | 28.04 |
| Yellow: | 95.26 | −2.42 | 46.46 |
| Green: | 79.04 | −30.91 | 14.10 |
| Cyan: | 75.00 | −38.38 | −31.56 |
| Blue: | 62.54 | −7.62 | −43.42 |

INHIBITION OF OIL POOLING: EXAMPLES 17-21

A solution (solution "A") was made by adding 20 g of methyl ethyl ketone and 20 g of toluene to 160 g of the solution from Example 1. A second solution (solution "B") was made by adding 0.4 g of crosslinked polymethylmethacrylate (PMMA) beads to 100 g of solution A. The PMMA beads were emulsion polymerized and had a mean diameter of 10–12 μm.

Solution B was coated onto polyester film using a #10 Mayer rod. The coated film was dried in a forced air oven at 93° C. for three minutes. Certain films were set aside for measurements; for others, a Post-It stripe was applied and a test pattern was imaged onto the film as in Example 2. These imaged films were immediately placed into a Flip-Frame transparency protector (available from 3M Co.). Since there were no particles on the back side of the transparency film, a piece of paper was inserted to prevent pooling between the back of the film and the Flip-Frame. Any pooling that was observed therefore occurred between the Flip-Frame and the sidle of the film with the particles. A static downward load of 6.2 kg was applied uniformly over an area of 9.5×20 cm of the Flip-Frame for 12 hours to accelerate the pooling of the fuser oil.

EXAMPLE 18

A solution was made by mixing 10 g of solution A with 10 g of solution B (both from Example A), giving a solution that was about 0.2% PMMA solids by weight. The solution was coated onto polyester film and processed as described in Example 17.

EXAMPLE 19

A solution was made by mixing 15 g of solution A with 5 g of solution B (both from Example 17), giving a solution that was about 0.1% PMMA solids by weight. The solution was coated onto polyester film and processed as described in Example 17.

EXAMPLE 20

A solution was made by mixing 17.5 g of solution A with 2.5 g of solution B (both from Example 17), giving a solution that was about 0.05% PMMA solids by weight. The solution was coated onto polyester film and processed as described in Example 17.

EXAMPLE 21

A solution was made by mixing 18.75 g of solution A with 1.25 g of solution B (both from Example 17), giving a solution that was about 0.025% PMMA solids by weight. The solution was coated onto polyester film and processed as described in Example 17.

The following table summarizes the results of Examples 17–21.

| Example | Particle Count (#/mm$^2$) | Haze (%) | Oil Pooling (not toned) | Oil Pooling (two layers toner) |
|---|---|---|---|---|
| 17 | — | 8.7 | none | pools |
| 18 | — | 4.8 | none | pools |
| 19 | — | 3.1 | none | pools |
| 20 | 9.9 | 2.5 | none | pools |
| 21 | 5.6 | 2.4 | some | pools |

What is claimed is:

1. An electrographic article comprising a transparent sheet having attached releasably thereto an overlay, at least a portion of such overlay being opaque, said overlay consisting of a sensing stripe and a tab, said sensing stripe being along and in register with a leading edge of said transparent sheet and having a width of from about 5 to about 20 mm, wherein said tab and said sensing stripe are separated by a transparent window, said transparent window being parallel to said leading edge of said transparent sheet, said transparent window being from about 5 to about 15 mm wide.

2. An electrographic article according to claim 1 wherein said overlay is paper.

3. An electrograph article according to claim 1 wherein said over layer has coated on a portion thereof at least one layer of adhesive.

4. An electrographic article according to claim 3 wherein said adhesive comprises an acrylic particulate adhesive.

5. An electrographic article according to claim 2 wherein said windows have a width of from about 5 mm to about 15 mm.

6. An electrographic article according to claim 2 wherein said overlay comprises a single opaque sheet constituting both said sensing stripe and said tab adhered along and in register with said leading edge of said transparent sheet, said opaque sheet having one or more transparent windows, parallel to both short and long edges of the transparency, and placed at least about 5 to about 10 mm from said edges, wherein the length of the windows is at least about 40 Mm.

7. An electrographic article according to claim 6 wherein said overlay is paper.

8. An electrographic article according to claim 6 wherein said over layer has coated on a portion thereof at least one layer of adhesive.

9. An electrographic article according to claim 8 wherein said adhesive comprises an acrylic particulate adhesive.

* * * * *

UNITED STATES PATENT AND TRADEMARK OFFICE

CERTIFICATE OF CORRECTION

PATENT NO. : 5,298,309

DATED : 3/29/94

INVENTOR(S) : Joseph C. Carls, Alan J. Herbert and Donald J. Williams

It is certified that error appears in the above-identified patent and that said Letters Patent is hereby corrected as shown below:

Column 1, Line 27, "charger-retaining" should read --charge-retaining--.

Column 2, Line 67, "particles/MM2$^2$" should read --particles/mm$^2$--.

Column 3, Line 7, "Attached" should read --attached--.

Column 5, Line 58, "on," should read --on--.

Column 6, Line 17, "2.3," should read --23,--.

Column 6, Line 56, "20°" should read --2°--.

UNITED STATES PATENT AND TRADEMARK OFFICE
CERTIFICATE OF CORRECTION

PATENT NO. : 5,298,309

DATED : 3/29/94

INVENTOR(S) : Joseph C. Carls, Alan J. Herbert and Donald J. Williams

It is certified that error appears in the above-identified patent and that said Letters Patent is hereby corrected as shown below:

Column 8, Line 32, "450°C" should read --45°C--.

Column 9, Line 17, "Post-It-" should read --Post-It™--.

Column 9, Line 47, "CLC,200" should read --CLC 200--.

Column 9, Line 58, "#120" should read --#20--.

Column 13, Line 16, "sidle" should read --side--.

Column 14, Line 25, "claim 1" should read --claim 2--.

Signed and Sealed this

First Day of November, 1994

*Attest:*

BRUCE LEHMAN

*Attesting Officer*

*Commissioner of Patents and Trademarks*